(12) United States Patent
Subbanna et al.

(10) Patent No.: US 8,463,843 B2
(45) Date of Patent: Jun. 11, 2013

(54) THROTTLING OF PREDICTIVE ACKS IN AN ACCELERATED NETWORK COMMUNICATION SYSTEM

(75) Inventors: Kartik Subbanna, Fremont, CA (US); Nitin Gupta, San Francisco, CA (US); Adityashankar Kini, San Carlos, CA (US); Daniel Conor O'Sullivan, San Francisco, CA (US); Shashidhar Merugu, Mountain View, CA (US); Steven James Procter, San Francisco, CA (US); Vivasvat Manohar Keswani, San Francisco, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 1441 days.

(21) Appl. No.: 11/754,940

(22) Filed: May 29, 2007

(65) Prior Publication Data
US 2008/0005274 A1 Jan. 3, 2008

Related U.S. Application Data

(60) Provisional application No. 60/809,086, filed on May 26, 2006.

(51) Int. Cl.
*G06F 15/16* (2006.01)
(52) U.S. Cl.
USPC ........... 709/203; 709/202; 709/218; 709/228; 709/232
(58) Field of Classification Search
USPC ................. 709/232–235, 238, 202–203, 206, 709/217–218, 227–228
See application file for complete search history.

(56) References Cited

U.S. PATENT DOCUMENTS

| 4,988,998 A | 1/1991 | O'Brien |
| 5,414,850 A | 5/1995 | Whiting |

(Continued)

FOREIGN PATENT DOCUMENTS

| EP | 0 813 326 A2 | 12/1997 |
| EP | 1 056 279 A1 | 9/2001 |

(Continued)

OTHER PUBLICATIONS

Caceres, Ramon et al., "Web Proxy Caching: The Devil Is in the Details," Jun. 1998, *Proceedings of the Workshop on Internet Server Performance*, Madison, Wisconsin, pp. 111-118.

(Continued)

*Primary Examiner* — Bharat N Barot
(74) *Attorney, Agent, or Firm* — Davis Wright Tremaine LLP; Philip H. Albert

(57) ABSTRACT

In a system where transactions are accelerated with asynchronous writes that require acknowledgements, with pre-acknowledging writes at a source of the writes, a destination-side transaction accelerator includes a queue for queue writes to a destination, at least some of the writes being pre-acknowledged by a source-side transaction accelerator prior to the write completing at the destination, a memory for storing a status of a destination-side queue and possibly other determinants, and logic for signaling to the source-side transaction accelerator with instructions to alter pre-acknowledgement rules to hold off on and pursue pre-acknowledgements based on the destination-side queue status. The rules can take into account adjusting the flow of pre-acknowledged requests or pre-acknowledgements at the sender-side transaction accelerator based at least on the computed logical length.

13 Claims, 3 Drawing Sheets

U.S. PATENT DOCUMENTS

| | | | |
|---|---|---|---|
| 5,737,594 A | 4/1998 | Williams | |
| 5,754,774 A | 5/1998 | Bittinger et al. | |
| 5,771,355 A | 6/1998 | Kuzma | |
| 5,822,746 A | 10/1998 | Williams | |
| 5,838,963 A | 11/1998 | Griffiths | |
| 5,903,723 A | 5/1999 | Beck et al. | |
| 5,977,890 A | 11/1999 | Rigoutsos et al. | |
| 5,990,810 A | 11/1999 | Williams | |
| 5,999,949 A | 12/1999 | Crandall | |
| 6,009,462 A | 12/1999 | Birrell et al. | |
| 6,105,067 A | 8/2000 | Batra | |
| 6,138,162 A | 10/2000 | Pistriotto et al. | |
| 6,163,811 A | 12/2000 | Porter | |
| 6,178,461 B1 | 1/2001 | Chan et al. | |
| 6,219,642 B1 | 4/2001 | Asghar et al. | |
| 6,233,253 B1 | 5/2001 | Settle et al. | |
| 6,324,581 B1 | 11/2001 | Xu et al. | |
| 6,369,723 B1 | 4/2002 | Pieterse et al. | |
| 6,397,253 B1 | 5/2002 | Quinlan et al. | |
| 6,415,323 B1 | 7/2002 | McCanne et al. | |
| 6,415,329 B1 | 7/2002 | Gelman et al. | |
| 6,449,615 B1 | 9/2002 | Liu et al. | |
| 6,449,658 B1 | 9/2002 | Lafe et al. | |
| 6,473,406 B1 | 10/2002 | Coile et al. | |
| 6,487,538 B1 | 11/2002 | Gupta et al. | |
| 6,513,061 B1 | 1/2003 | Ebata et al. | |
| 6,519,576 B1 | 2/2003 | Freeman | |
| 6,546,428 B2 | 4/2003 | Baber et al. | |
| 6,553,141 B1 | 4/2003 | Huffman | |
| 6,563,517 B1 | 5/2003 | Bhagwat et al. | |
| 6,574,618 B2 | 6/2003 | Eylon et al. | |
| 6,578,054 B1 | 6/2003 | Hopmann et al. | |
| 6,578,073 B1 | 6/2003 | Starnes et al. | |
| 6,598,081 B1 | 7/2003 | Coile et al. | |
| 6,622,168 B1 | 9/2003 | Datta | |
| 6,642,860 B2 | 11/2003 | Meulenbroeks | |
| 6,643,701 B1 | 11/2003 | Aziz et al. | |
| 6,667,700 B1 | 12/2003 | McCanne et al. | |
| 6,678,828 B1 | 1/2004 | Pharm et al. | |
| 6,704,730 B2 | 3/2004 | Moulton et al. | |
| 6,721,780 B1 | 4/2004 | Kasriel et al. | |
| 6,757,733 B2 | 6/2004 | Gupta | |
| 6,772,193 B1 | 8/2004 | Igawa et al. | |
| 6,789,255 B1 | 9/2004 | Pedrizetti et al. | |
| 6,820,133 B1 | 11/2004 | Grove et al. | |
| 6,822,955 B1 | 11/2004 | Brothers et al. | |
| 6,839,682 B1 | 1/2005 | Blume et al. | |
| 6,856,651 B2 | 2/2005 | Singh | |
| 6,874,017 B1 | 3/2005 | Inoue et al. | |
| 6,894,981 B1 | 5/2005 | Coile et al. | |
| 6,940,835 B2 | 9/2005 | Reza et al. | |
| 6,973,485 B2 | 12/2005 | Ebata et al. | |
| 6,981,029 B1 | 12/2005 | Menditto et al. | |
| 7,047,485 B1 | 5/2006 | Klein et al. | |
| 7,058,958 B1 | 6/2006 | Shutt et al. | |
| 7,082,456 B2 | 7/2006 | Mani-Meitav et al. | |
| 7,120,666 B2 | 10/2006 | McCanne et al. | |
| 7,123,613 B1 | 10/2006 | Chawla et al. | |
| 7,139,811 B2 | 11/2006 | Lev Ran et al. | |
| 7,149,817 B2 | 12/2006 | Pettey | |
| 7,161,947 B1 | 1/2007 | Desai | |
| 7,165,095 B2 | 1/2007 | Sim | |
| 7,224,839 B2 | 5/2007 | Zeineh | |
| 7,230,949 B2 | 6/2007 | Bharali et al. | |
| 7,316,028 B2 | 1/2008 | Donatelli et al. | |
| 7,336,682 B2 | 2/2008 | Singh | |
| 7,369,498 B1 | 5/2008 | Ma et al. | |
| 7,499,981 B2 | 3/2009 | Harrow et al. | |
| 7,619,545 B2 | 11/2009 | Samuels et al. | |
| 7,698,453 B2* | 4/2010 | Samuels et al. | 709/218 |
| 7,809,818 B2 | 10/2010 | Plamondon | |
| 7,827,237 B2 | 11/2010 | Plamondon | |
| 7,853,699 B2* | 12/2010 | Wu et al. | 709/227 |
| 7,865,585 B2 | 1/2011 | Samuels et al. | |
| 7,916,047 B2 | 3/2011 | Samuels et al. | |
| 8,321,580 B2* | 11/2012 | McCanne et al. | 709/203 |
| 2001/0051927 A1 | 12/2001 | London et al. | |
| 2002/0013853 A1 | 1/2002 | Baber et al. | |
| 2002/0016911 A1 | 2/2002 | Chawla et al. | |
| 2002/0023145 A1 | 2/2002 | Orr et al. | |
| 2002/0029326 A1 | 3/2002 | Reuter et al. | |
| 2002/0032787 A1 | 3/2002 | Overton et al. | |
| 2002/0038371 A1 | 3/2002 | Spacey | |
| 2002/0062384 A1 | 5/2002 | Tso | |
| 2002/0087547 A1 | 7/2002 | Kausik et al. | |
| 2002/0091801 A1 | 7/2002 | Lewin et al. | |
| 2002/0107971 A1 | 8/2002 | Bailey et al. | |
| 2002/0138511 A1 | 9/2002 | Psounis et al. | |
| 2002/0147895 A1 | 10/2002 | Glance et al. | |
| 2002/0156911 A1 | 10/2002 | Croman et al. | |
| 2002/0157019 A1 | 10/2002 | Kadyk et al. | |
| 2002/0163884 A1 | 11/2002 | Peles et al. | |
| 2002/0194382 A1 | 12/2002 | Kausik et al. | |
| 2003/0009583 A1 | 1/2003 | Chan et al. | |
| 2003/0014628 A1 | 1/2003 | Freed et al. | |
| 2003/0043844 A1 | 3/2003 | Heller | |
| 2003/0055826 A1 | 3/2003 | Graham | |
| 2003/0115488 A1 | 6/2003 | Kunito et al. | |
| 2003/0163646 A1 | 8/2003 | O'Neil | |
| 2004/0088376 A1 | 5/2004 | McCanne et al. | |
| 2004/0186861 A1 | 9/2004 | Phatak | |
| 2004/0215746 A1 | 10/2004 | McCanne et al. | |
| 2004/0243703 A1 | 12/2004 | Demmer et al. | |
| 2005/0044242 A1 | 2/2005 | Stevens et al. | |
| 2005/0060426 A1* | 3/2005 | Samuels et al. | 709/238 |
| 2005/0125553 A1 | 6/2005 | Wu et al. | |
| 2006/0069719 A1 | 3/2006 | McCanne et al. | |
| 2006/0212524 A1 | 9/2006 | Wu et al. | |
| 2006/0212935 A1 | 9/2006 | Burman et al. | |
| 2006/0248194 A1 | 11/2006 | Ly et al. | |
| 2007/0150672 A1 | 6/2007 | Alexander et al. | |
| 2008/0281908 A1* | 11/2008 | McCanne et al. | 709/203 |
| 2011/0238738 A1* | 9/2011 | Wu et al. | 709/203 |
| 2012/0197965 A1* | 8/2012 | McCanne et al. | 709/202 |

FOREIGN PATENT DOCUMENTS

| | | |
|---|---|---|
| JP | 2002/359649 | 12/2002 |
| JP | 2004/254039 | 9/2004 |
| JP | 2004/348495 A | 12/2004 |
| WO | WO 95/20793 A1 | 8/1995 |
| WO | WO 98/16067 A2 | 4/1998 |
| WO | WO 00/13110 A1 | 3/2000 |
| WO | WO 01/63420 A1 | 8/2001 |
| WO | WO 01/65831 A2 | 9/2001 |
| WO | WO 01/80022 A1 | 10/2001 |
| WO | WO 01/97526 A1 | 12/2001 |
| WO | WO 02/54699 A2 | 7/2002 |

OTHER PUBLICATIONS

Deshpande, Mukund et al., "Selective Markov Models for Predicting Web-Page Accesses," 2004, *ACM Transactions on Internet Technology*, vol. 4, Issue 2, pp. 163-184.

Fan, Li et al., "Summary Cache: A Scalable Wide-Area Web Cache Sharing Protocol," Jun. 2000, *Proceedings of the IEEE/ACM Transactions on Networking*, vol. 8, No. 3, pp. 281-293.

Feldmeier, D.C. et al., "Protocol Boosters," Apr. 1998, IEEE JSAC, vol. 16, Issue No. 3, pp. 437-444.

Griffioen, James et al., "Automatic Prefetching in a WAN," Oct. 1993, *Proceedings of the IEEE Workshop on Advances in Parallel and Distributed Systems*, Technical Report # CS243-93, pp. 8-12.

Griffioen, James et al., "Reducing File System Latency using a Predictive Approach," Jun. 1994, *Proceedings of the USENIX Summer 1994 Technical Conference on USENIX*, Technical Conference, vol. 1.

Lei, Hui et al., "An Analytical Approach to File Prefetching," Jan. 1997, *Proceedings of the Annual Conference on USENIX Annual Technical Conference*, Anaheim, California, pp. 1-12.

Oly, James et al., "Markov Model Prediction of I/O Requests for Scientific Applications," Jun. 2002, *Proceedings of the 16th International Conference on Supercomputing*, pp. 147-155.

Rhea, Sean C. et al., "Value-Based Web Caching," May 2003, *Proceedings of the 12th International Conference on World Wide Web*, Budapest, Hungary, pp. 619-628.

Tolia, Niraj, et al., "An Architecture for Internet Data Transfer", *Third Symposium on Networked Systems Design and Implementation (NSDI'06)*, San Jose, California, May 2006.

Yang, Qiang et al., "Mining Web Logs for Prediction Models in WWW Caching and Prefetching," Aug. 2001, *Proceedings of the Seventh ACM SIGKDD International Conference on Knowledge Discovery and Data Mining KDD'01*, San Francisco, California, pp. 473-478.

Bungum, O.W., "Transmultiplexing, Transcontrol and Transscrambling of MPEG-2/DVB Signal," Int'l. Broadcasting Convention, London, GB, Sep. 12-16, 1996, pp. 288-293.

Sayood, Khalid et al., "Recursively Indexed Quantization of Memoryless Sources," *IEEE Transactions on Information Theory*, Sep. 1992, pp. 1602-1609, vol. 38, No. 5.

Manber, Udi, "A Text Compression Scheme that Allows Fast Searching Directly in the Compressed File," Department of Computer Science, University of Arizona, Technical Report #93-07, Mar. 1993.

Manber, Udi, "Finding Similar Files in a Large File System," Department of Computer Science, University of Arizona, Technical Report #93-33, Oct. 1993.

Manber, Udi et al., "GLIMPSE: A Tool to Search Through Entire File Systems," Department of Computer Science, University of Arizona, Technical Report #93-34, Oct. 1993.

Franaszek, P. et al., "Parallel Compression with Cooperative Dictionary Construction," Data Compression Conference, 1996, DCC '96 Proceedings, Mar. 21-Apr. 3, 1996, pp. 200-209.

Lin, K. et al., "Code Compression Techniques Using Operand Field Remapping," *IEEE Proc.-Comput. Digit. Tech.*, Jan. 2002, pp. 25-31, vol. 149, No. 1, Jan. 2002, pp. 25-31.

Mellia, M. et al., "TCP Smart-Framing: Using Smart Segements to Enhance the Performance of TCP," Global Telecommunications Conference, 2001, GLOBECOM '01, *IEEE*, Nov. 2001, pp. 1709-1712, vol. 3, Nos. 25-29.

Padmanabhan, V. et al., "Using Predictive Prefetching to Improve World Wide Web Latency " *IEEE Transactions on Antennas and Propagation*, 26(3):22-36 (1996).

Amer, A. et al., "File Acess Prediction with Adjustable Accuracy," *Conf. Proc. of 2002 IEEE Int. Performance, Computing, and Communications*, 21:131-140, conference held Apr. 3-May 5, 2002, Phoenix, Arizona.

Chakrabarti, S., "Low-Bandwidth Web Access with Tandem Proxies," Department of Electrical Engineering and Computer Science, Massachussetts Institute of Technology, Sep. 2002, pp. 1-64.

"Unleashing the True Power of Today's Networks," *A Peribit White Paper*, Aug. 2002, pp. 1-13, URL=http://www.peribit.com/products/etc/0217w02punl.htm.

Spring, Neil T. et al., "A Protocol-Independent Technique for Eliminating Redundant Network Traffic," Proceedings of {ACM} {SIGCOMM}, Aug. 2000, URL=http://www.acm.org/sigs/sigcomm/sigcomm2000/conf/papers/sigcomm2000-3-1.pdf, 9 pp.

Muthitacharoen, A. et al., "A Low-Bandwidth Network File System," Symposium on Operating Systems Principles, 2001, pp. 147-187, URL=http://www.pdos.lcs.mit.edu/papers/lbfs:sosp01/lbfs.pdf.

Knutsson, B. et al., "Transparent Proxy Signalling," *Journal of Communication Networks*, Mar. 2001, pp. 1-11.

Border et al. "Performance Enhancing Proxies Intended to Mitigate Link-Related Degradations," Network Working Group Request for Comments: 3135 (Jun. 2001).

Factor, presence Michael and Sheinwald, Dafna, "Compression in the presence of shared data," 2001; *Information Sereis*; vol. 135; pp. 29-41.

Housel, B. C. et al., "Emulator Express: A System for Optimizing Emulator Performace for Wireless Networks;" 2000; IBM Systems Journal; vol. 39' No. 2; pp. 384-402.

Kahol et al., "A Strategy to Manage Cache Consistency in a Disconnected Distributed Network," IEEE, Jul. 2001.

Mogul et al. "Delta encoding in HTTP," Network Group Internet-Draft (Oct. 2001).

White, J., "Supply Chain Responsiveness," Britvic Soft Drinks, Carrow, Norvich, Feb. 23, 1998, XP0006506548.

European Office Action received on Jul. 19, 2010 in related European Application No. 05736807.8.

International Search Reported mailed Jul. 2, 2008 in International patent application S. N. PCT/US2007/69907 (8 pages).

International Search Report mailed Dec. 12, 2007 for PCT application No. PCT/US2006/10006.

International Search Report mailed Oct. 10, 2007 in international patent application S.N. PCT/US2006/009945.

International Search Report mailed Jul. 13, 2007 in international patgent application S.N. PCT/US2006/029158.

Notice of Allowance mailed Jul. 30, 2012 in U.S. Appl. No. 13/459,065.

Office Action mailed May 17, 2011 in U.S. Appl. No. 12/191,514.

Request for Reexamination of U.S. Patent No. 7,428,573 filed Sep. 14, 2012 (54 pgs).

Request for Reexamination of U.S. Patent No. 7,849,134 filed Sep. 14, 2012 (54 pgs).

* cited by examiner

THROTTLING OF PREDICTIVE ACKS IN AN ACCELERATED NETWORK COMMUNICATION SYSTEM

CROSS-REFERENCE TO RELATED APPLICATIONS

The present disclosure may be related to the following commonly assigned applications/patents:

U.S. patent application Ser. No. 10/285,315, filed 30 Oct. 2002 and entitled "Transaction Accelerator for Client-Server Communication Systems," now U.S. Pat. No. 7,120,666 B2 issued Oct. 10, 2006 (hereinafter "McCanne I");

U.S. patent application Ser. No. 10/640,405, filed 12 Aug. 2003 and entitled "Transparent Client-Server Transaction Accelerator," now U.S. Publication No. 2004/0215735 published Oct. 28, 2004 (hereinafter "McCanne III");

U.S. patent application Ser. No. 10/640,459, filed 12 Aug. 2003 and entitled "Content Delivery for Client-Server Protocols with User Affinities using Connection End-Point Proxies," now U.S. Publication No. 2005/0125553 published Jun. 9, 2005 (hereinafter "McCanne V"); and U.S. patent application Ser. No. 11/243,068, filed Oct. 3, 2005 and entitled "Improved Reliability and Availability of Distributed File Servers," now U.S. Publication No. 20060212935 published Sep. 21, 2006 (hereinafter "Burman").

The respective disclosures of these applications/patents are incorporated herein by reference in their entirety for all purposes.

FIELD OF THE INVENTION

The present invention relates to network communication acceleration in general and in particular to acceleration techniques involving pre-acknowledgement of transactions.

BACKGROUND OF THE INVENTION

As described in McCanne I, McCanne III, and McCanne V, a system of transaction accelerators can improve performance of protocols such as CIFS and NFS by pre-acknowledging asynchronous writes. As described in Burman, such capabilities can also be useful for a variety of distributed server systems. Such pre-acknowledgement is allowed by the protocol semantics and thus ordinarily does not affect correctness, while allowing a substantial performance improvement.

However, in some rare scenarios the LAN connection between the server-side transaction accelerator and the server could severely degrade, or the server performance could be inadequate for the request volume being sent. Common examples of problems that cause such LAN degradation include the presence of speed/duplex misconfigurations or the LAN dropping to a lower-speed regime (such as 10 Mb/s instead of 100 Mb/s). Such degradation may cause connections to terminate due to the server or the client timing out. The server terminating the connection might result in loss of data that has been acknowledged.

While technically allowed by the protocol, such behavior is undesirable and should be avoided. To avoid this problem, the system of transaction accelerators must pre-acknowledge writes only as fast as the server can process them. In addition, delivering requests at a pace that matches the server's capacity makes better use of server resources and allows the server to support higher overall volumes of traffic.

A bottleneck in the system is at the server-side transaction accelerator. If the server or server-side LAN have inadequate performance, it is possible that the pre-acknowledged writes could be waiting for a long time on the server-side transaction accelerator and in rare scenarios cause data loss.

BRIEF SUMMARY OF THE INVENTION

In a system where transactions are accelerated with asynchronous writes that require acknowledgements, with pre-acknowledging writes at a source of the writes, a destination-side transaction accelerator includes a queue for queue writes to a destination, at least some of the writes being pre-acknowledged by a source-side transaction accelerator prior to the write completing at the destination, a memory for storing a status of a destination-side queue and possibly other determinants, and logic for signaling to the source-side transaction accelerator with instructions to alter pre-acknowledgement rules to hold off on and pursue pre-acknowledgements based on the destination-side queue status.

A method of limiting potential data loss when pre-acknowledging requests is provided, comprising receiving a message as part of a transaction at a recipient-side transaction accelerator, the message being a message for which a sender expects an acknowledgement and for which a sender-side transaction accelerator sent a recipient acknowledgement of the transaction in advance of the recipient acknowledging the transaction, computing a logical length for a request queue at the recipient-side transaction accelerator, the request queue for holding contents of messages not yet sent to the recipient, and adjusting the flow of pre-acknowledged requests or pre-acknowledgements at the sender-side transaction accelerator based at least on the computed logical length.

The logical length for the request queue can be based on an actual length of the request queue and a historical value of the logical length. The logical length for the request queue can be an actual length of the request queue, and/or a function of one or more of destination-side server processing, server-side LAN characteristics and/or the size of the write queue at the destination-side transaction accelerator.

Destination-side queue status might be determined from an upper limit, wherein reaching the upper limit causes the source-side transaction accelerator to stop pre-acknowledging writes and when the size of the destination-side queue reaches a lower limit, the source-side transaction accelerator pre-acknowledges writes.

The status of a destination-side queue can be determined from one or more of predicted congestion based on the number of pending write requests at the destination-side transaction accelerator, the volume of the data being written, a limit on the volume of data allowed to be represented by pre-acknowledged writes, actual queue length, and/or logical queue length other than actual queue length. The status of the destination-side queue can be determined from a logical queue length that is dependent on the actual queue length and one or more of queue pendency times for write requests, amount of time spent in the queue may be estimated based on characteristics of the server-side LAN, weights based on empirical observations, dynamic weights based on current network conditions and/or historical logical queue lengths.

The following detailed description together with the accompanying drawings will provide a better understanding of the nature and advantages of the present invention.

DETAILED DESCRIPTION OF THE INVENTION

Figure 1:
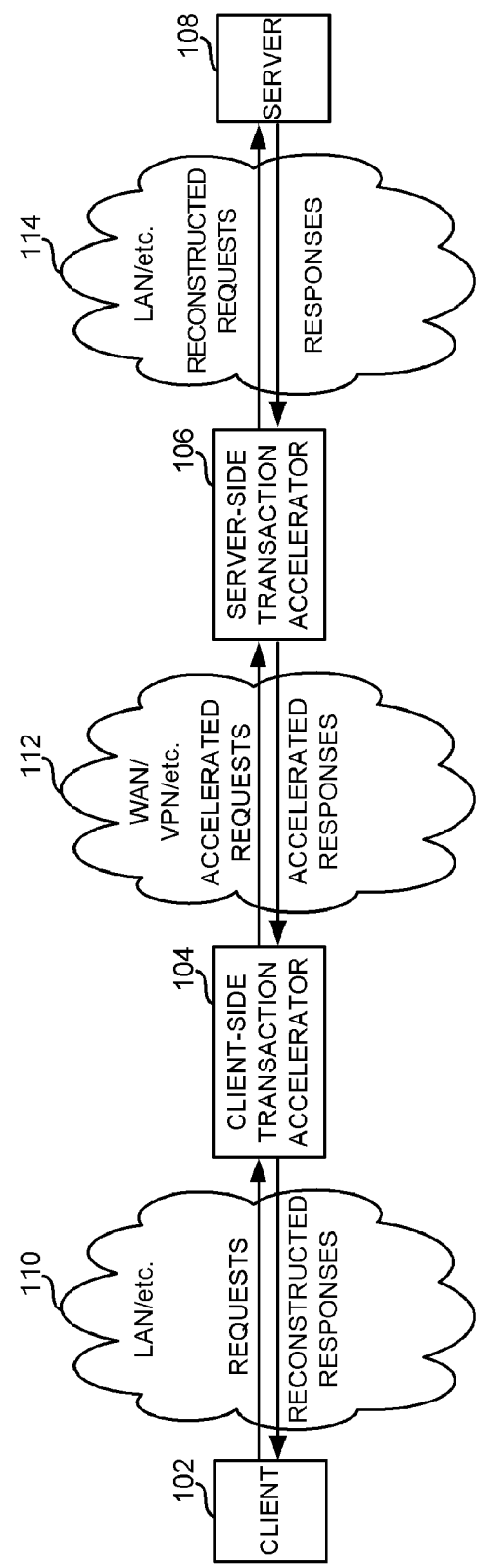
FIG. 1 is a block diagram showing elements of a network with which aspects of the present invention might be implemented.

The present invention has many applications, as will be apparent after reading this disclosure. In describing an embodiment of a data transport and optimization system according to the present invention, only a few of the possible variations are described. Other applications and variations will be apparent to one of ordinary skill in the art, so the invention should not be construed as narrowly as the examples, but rather in accordance with the appended claims.

An improved transaction acceleration system and methods are described herein. In one example transaction acceleration system, for example one described in McCanne I or McCanne III, a pair of transaction accelerators is positioned to catch data flow between two network nodes (in the simple case) and accelerate that data flow. This can be done by replacing data in the flow at one transaction accelerator and restoring the data at the other transaction accelerator, for example by replacing segments of data flowing in one direction with segment references and then restoring the data represented by those segment references at the other transaction accelerator.

Another transaction acceleration technique that can be used, with or without the above segment replacement, is to predictively generate synthetic transactions. For example, a server-side transaction accelerator ("TA") might predict that a client will request a particular block of data and that server-side TA ("STA") can inject the request into a server in advance of receiving the client's request (which would be via a client-side TA, or "CTA"), so that the CTA and STA are "primed" to respond to the client's request when it actually occurs and can then do so more quickly than if the predicted request was not executed.

A transaction, as the term is used herein, is a logical set of steps that result in data moving from one place to another. In some cases, the data being moved exists at its origin independent of the transaction, such as a file read transaction where the file exists on the disk of the server. In other cases, the data is generated for the transaction at the origin, such as in response to a request for computation, lookup, etc. Typically, the computer, computer device, etc., initiating the transaction is referred to as the "client" and the computer, computer device, etc., that responds, or is expected to respond, is referred to as the "server". Data can flow in either direction. For example, a file system client might initiate a transaction by requesting a file read from a file server. The corresponding data will be returned from the server responding to the request, so in that case, the bulk of the data flows from the server to the client. However, where a client initiates a file write transaction, the bulk of the data flows from the client to the server, either as part of the initial request or as subsequent messages.

In some of the examples, one side of a transaction is referred to as the client and the other side is referred to as the server. In many cases, transaction accelerators can operate in either direction, i.e., a given transaction accelerator might accelerate data flows between a near client and a remote server or between a remote client and a near server. In some cases, the operation is the same, i.e., a transaction accelerator pair take the same actions when a client is reading/writing files on a server as it would when the server is reading/writing files on the client.

A transaction can be in multiple parts, but in a simple transaction, a client sends a request (data, a message, a signal, etc., explicitly being the request or indicative of, or representing, the request) to a server and the server responds with a response (data, a message, a signal, etc., explicitly being the response or indicative of, or representing, the response) to the client. More complex transactions, for example, might involve some back and forth, as might be needed for a server to clarify a request, verify the authority of the client to receive a response to the request, get additional information needed for preparing the response, etc.

Herein, the typical example of a connection between a client and a server is a packet network, but other connection means can also be used, such as a point-to-point wired or wireless channel. These elements will be generalized and referred to herein as "nodes" with a channel assumed for communication between the nodes.

A transaction might begin with a client at one node making a request for file data directed to a server at another node, followed by a delivery of a response containing the requested file data. Other transactions might be a request for a specific part of a file, the entire file, all or some of another data construct, or a transaction might relate to data flowing from the requester or relate to a command. Examples of transactions include "read a block", "read a file", "read a stream", "write a block with this data" (an example of data flowing from the requester), "open a file", "perform a calculation on this data", "get an e-mail with these characteristics", "send an e-mail", "check for new e-mails", "list directory contents", etc.

Some transactions might involve large amounts of data flowing in one direction or both directions. Some transactions might even involve interactions having more than one requester and/or more than one receiver. For clarity of description, these many transaction types are described in terms of a typical simple transaction, where one client makes a request of one server and that one server responds to the request in a manner expected by the client. However, upon reading this disclosure, a person of ordinary skill will be able to apply these concepts to one-to-many and many-to-many transactions between client(s) and server(s) or more generally between two nodes. Where data flow is described in one direction, it should be understood that data might flow in the other direction and/or information might flow in only one direction, but data and/or signals flow in both directions to accomplish the movement of information.

Using some of the systems described herein, client access to a server (and vice versa where needed), can be "tunneled" through transaction accelerators that map transactions onto sequences of variable-length segments with content-induced segment cut points. The segments can be stored at various places, typically within high-speed access of both the clients and the servers, with the segments stored using a scalable, persistent naming system. The segments can be decoupled from file-system and other system data blocks and structures, so that a matching segment might be found in multiple contexts. Instead of caching files, blocks, or other system dependent constructs, segments can be stored and bound to references that are used to represent the segment contents.

In some implementations, the TA is implemented entirely in software, while in other implementations the TA might be implemented in hardware, firmware or some combination of hardware, firmware and/or software. For example, a special router or switch might be devised that runs the engine in software in addition to its regular function. In a specific embodiment, a dedicated engine appliance is deployed in the network infrastructure between client and server sites and might be based on the Linux™ operating system.

As will be described herein, the engines reduce bandwidth usage and reduce latency for transactions between clients and servers. Such transactions might include copying a file from a distant file server to a local storage device, backing up remote file servers to a main data center storage device, sending a very large CAD file to a colleague over a large distance, etc. As should be apparent from this description, transactions need not be limited to file related activities.

As used herein, "near" may refer to physical proximity, but can also refer to network proximity. Network proximity relates to performance attributes. As an example, two nodes of a LAN might be considered more near than two nodes separated by a slow network channel. Often is the case that large physical distances do not result in network proximity, but there are examples where two nodes can be physically close but faraway in network terms and where two nodes can be physically far away but relatively close in network terms. Preferably, engines are positioned to be in network proximity with the nodes that seek a benefit from the engines.

In various embodiments, the engine is a transport-level proxy that conceptually operates in pair-wise configurations, with one engine situated near one or more servers (the "server site") and another situated near clients (the "client site"). Engines communicate with one another in a paired fashion, i.e., a transaction between one client and one server might be accelerated using a particular client-side engine and a particular server-side engine. Engines might be clustered and meshed across a WAN, possibly allowing any engine to communicate directly with any other engine. While one engine might be described as a client-side engine and another engine described as a server-side engine, it should be understood that engines can be symmetric, such that data could be accelerated from the client to the server or from the server to the client. In addition, a given engine could be a client-side engine for one transaction and a server-side engine for another transaction, possibly involving the same network devices.

Engines can intercept client-server connections without interfering with normal client-server interactions, file semantics, or protocols. All client requests can be passed through to the server normally, while relevant traffic is optimized to improve performance.

FIG. 1 shows elements of a network, which might contain multiple nodes, clients, servers and transaction accelerators handling multiple connections at once, whereas only one client and server are shown there. In that example, a client 102 is coupled to a client-side transaction accelerator (CTA) 104, which is turn coupled to a server-side transaction accelerator (STA) 106, which is turn coupled to a server 108. Coupling can be doing in various ways. One way is to have communication sessions between objects that are coupled. Preferably, client 102 appears to be connected to server 108 and vice versa, so that no special handling is needed at the client or the server.

In the figure, client 102 is shown coupled to CTA 104 over a network 110, which is often a LAN or other network that performs better than some networks that might be WANs. CTA 104 and STA 106 are shown coupled over a network 112, which could be a WAN, VPL, or the like, typically having more performance limitations than 110, with some of those limitations being overcome, all of in part, by the action of the CTA/STA pair. STA 106 is shown coupled over a network 114 to server 108, where network 114 can be a LAN or similar, but need not be.

The couplings might include additional routing, switching, or bridging devices and links not shown in FIG. 1. Network 112 may comprise of a variety or networks or internets capable of carrying data messages, including virtual private networking protocols.

As illustrated, client 102 sends a request directed to server 108 and that request (be it a file read, file write, query, access, etc.) is routed to server 108 through CTA 104 and STA 106, which can accelerate the request. When server 108 receives the request (the reconstructed request can be made to look exactly like the original request, only received sooner and/or with less use of bandwidth. The server's response then goes in a return direction to the client. The response can be data, an error message, an acknowledgement of receipt of the client's request, etc.

In an embodiment, both CTA 104 and STA 106 are connection-oriented in that traffic between client 102 and CTA 104 is governed by the form of connections opened or closed between client 102 and CTA 104. A similar connection-oriented approach might apply both to traffic between CTA 104 and STA 106, and STA 106 and server 108. Other embodiments may handle network traffic between these elements only as individual messages or packets, but a connection-oriented approach has advantages of both robustness and higher performance in many practical situations.

CTA 104 might be designed as a network proxy, with separate hardware or not, or as part of a client, likewise with STA 106.

TA Architecture

Figure 2:
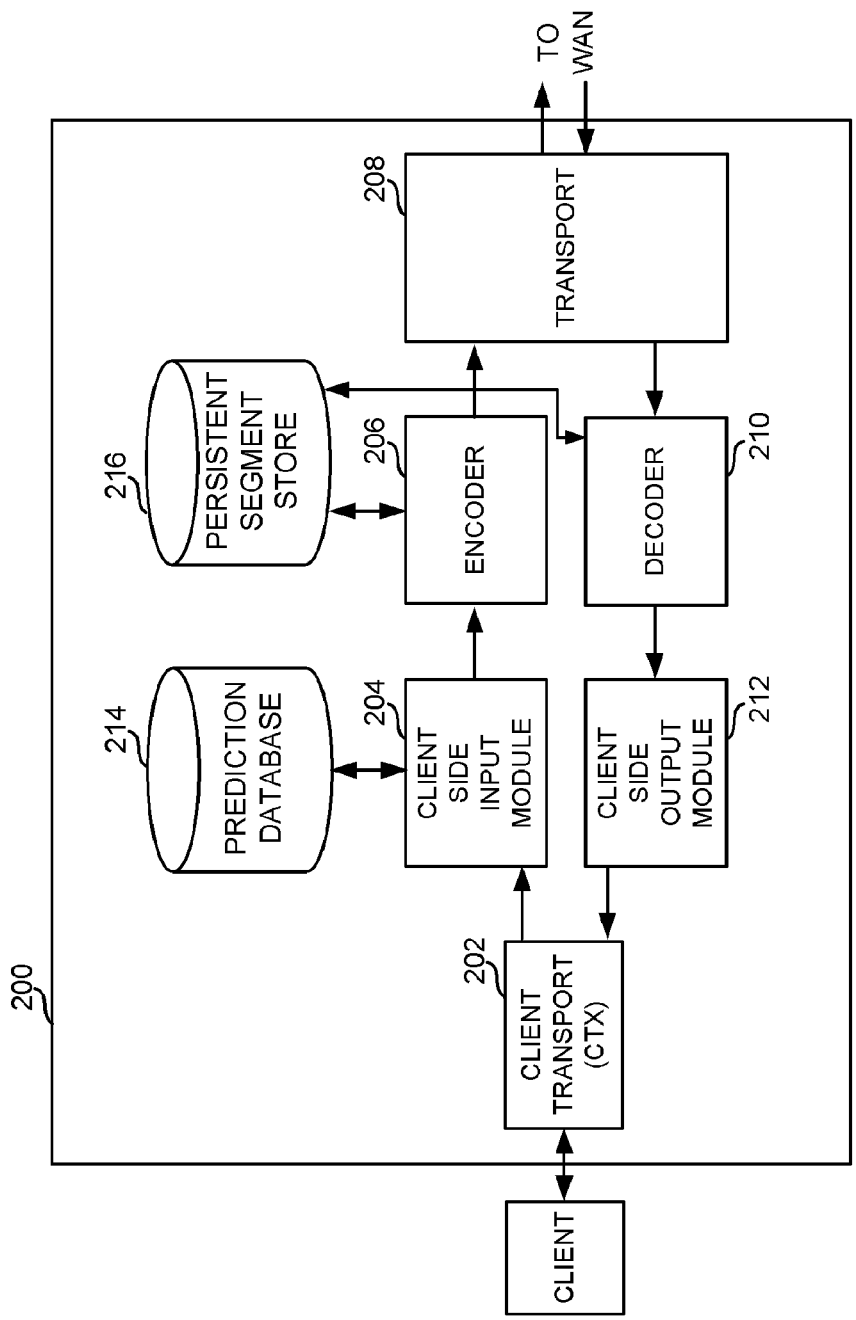
FIG. 2 is a schematic diagram of a transaction accelerator in greater detail.

FIG. 2 is a schematic diagram of CTA 104 in greater detail. As is apparent in McCanne I and McCanne III and the earlier disclosure herein, CTA 104 and STA 106 can have many symmetrical elements. Though the CTA might appear as an infrastructure device with network interfaces and so forth, it can be embodied almost entirely in software. This software can be delivered in an appliance form-factor, pre-configured and installed on a qualified server. For example, it might be provided as hardware and software, with software pre-loaded on a microprocessor-based server with appliance hardware running the Linux™ operating system, the Microsoft Windows operating system, etc.

A TA may connect to a network with one or more network interfaces. When acting transparently and intercepting connections transparently, the TA could include two network interfaces or use a dual-port network interface so that the device could be inserted transparently into a network. One such configuration is to insert the device between a layer-2 switch and a router and function as a link-layer relay or bridge between said switch and the router. Some dual-port network interfaces include physical bypass circuits with watchdog timers that fail-over when the device malfunctions. Using a dual-ported network interface, all traffic can thus be intercepted and delivered to a local proxy process running on the device. Likewise, any traffic that need not be processed can be simply forwarded from one interface to the other unmodified.

Variations of the TA might offer a range of different capabilities and hardware mixes. A low-end branch office device might be a single-CPU, 1U device with low-cost internal ATA disks. Datacenter devices might have higher-performance, multi-way CPUs with an option for external storage attachment, e.g., via FiberChannel or iSCSI. Some variants of the TA can be packaged as blades in a blade server or as software that could be installed on a client desktop or integrated into application server software.

In one specific implementation, a system employs an event-driven programming model that is SMP capable and is written in portable C++. The programming model is event-based with threads hidden behind the event model, providing the concurrency mechanism needed to benefit from SMP-equipped configurations.

CTA 200 shown in FIG. 2 comprises a client transport module (CTX) 202, a client-side input module (CSIM) 204, encoder 206, transporter 208 in a chain that sends data from the client to a WAN (or other network). For data from the WAN (or other network), transporter 208 provides data to a decoder 210, which provides data to a client-side output module (CSOM) 212, which communicates with CTX 202. CSIM is coupled to a prediction database 214 that is used to determine when to predict all or part of a transaction. Also shown is a persistent segment store 216 that might be used in transaction acceleration. Other elements might be present but not shown. McCanne I shows other elements that might be included.

Transaction Prediction

Even with segment cloning and other techniques to reduce bandwidth usage, network links still would have an inherent latency imposed by the speed of light, which can have a dramatic impact on overall client-server throughput and performance as described above. This latency can be addressed by transaction prediction. In most of these examples, a pair of TAs is assumed, but as described in McCanne III, it is possible to perform transaction prediction using a single engine, if paired segment cloning is not done.

A TA attempts to anticipate client behaviors before they occur and execute predicted transactions ahead of client activity. Once the client actually issues the predicted transaction, the transaction results can be immediately produced without incurring a wide-area round trip. Transactions could be data requests, write requests with ACK, or other transactions normally involving a round trip.

Predicting transactions is quite different than caching. With caching, a cache maintains a store of data that represents data objects such as files, file blocks, Web pages, email messages, etc. where the cached data is a copy of all or part of the data object being cached. Those copies must be exact, i.e., a cache must be able to detect when its data no longer matches the official copy of the object (cache consistency) and determine how long to keep what data copies. A cache needs to maintain its store and implement server-like protocol machinery to serve client requests for the cached data objects. Likewise, a cache must implement client-like protocol machinery to issue requests to the server for data that is missing from its cache. While building a store of such objects is straightforward, keeping that store coherent with the original copy in the midst of multiple clients accessing and modifying the objects, with security protocols, locking mechanisms, and so forth all create a complex, difficult to manage architecture.

Transaction prediction, on the other hand, avoids the complexities of coherency by logically sending transactions back to the server. Unlike a cache, an engine that does transaction prediction only needs partial protocol knowledge to know when and if it is safe to perform various optimizations and does not require server or client mechanisms embedded in the system. Another distinction is that caches generally need to maintain their data stores much longer than a predicted transaction's results are maintained, making consistency control much simpler while providing benefits that a caching system might provide.

Pre-Acknowledgment of Writes

In some cases, latency is the biggest factor in network performance. Suppose a client reads a file by sending a server a request for a block of data and after receiving the block of data, requests a next block of data. A pair of transaction accelerators can accelerate this transfer over a connection with a long latency by, for example, having the STA anticipate the request and make a read request of the server.

Latency can also be reduced, in some cases, with the use of pre-acknowledgement of writes. From a client's perspective, it makes a request to write data to a file server, the file server acknowledges a successful write of the data, and the client proceeds to its next step, for example, writing another block. This process might be accelerated by having the CTA immediately acknowledge the write to the client even though the server has not yet written the data. The STA can monitor all of the CTA's pre-acknowledgements and note when the server actually does send an acknowledgement of the write. The STA can signal the CTA as to the receipt of the server's pre-acknowledgement of the write, but that might not be necessary and even if it did occur, the CTA will probably not signal the client as to the receipt of the server's pre-acknowledgement of the write, since the CTA had already acknowledged the write (in advance of it actually occurring).

Of course, with such pre-acknowledgement (pre-ACK) of writes, there may be situations where a write is acknowledged to a client but then network conditions and/or the states of the TAs or server prevent a successful write. That would cause problems, as a client might not be set up to understand that a write that was acknowledged did not actually occur and cannot occur. If the data to be written is not preserved in the network and the client is programmed to delete write data after it receives an acknowledgement that the data was successfully written (a reasonable approach), that data would be lost.

To avoid or reduce such occurrences, a STA can convey to a CTA a situation wherein congestion or other conditions would increase the probability that a successful write would not occur at the server end so that the CTA can defer pre-ACK of writes and only acknowledge writes after the server has done so.

Example Pre-ACK Process

Figure 3:
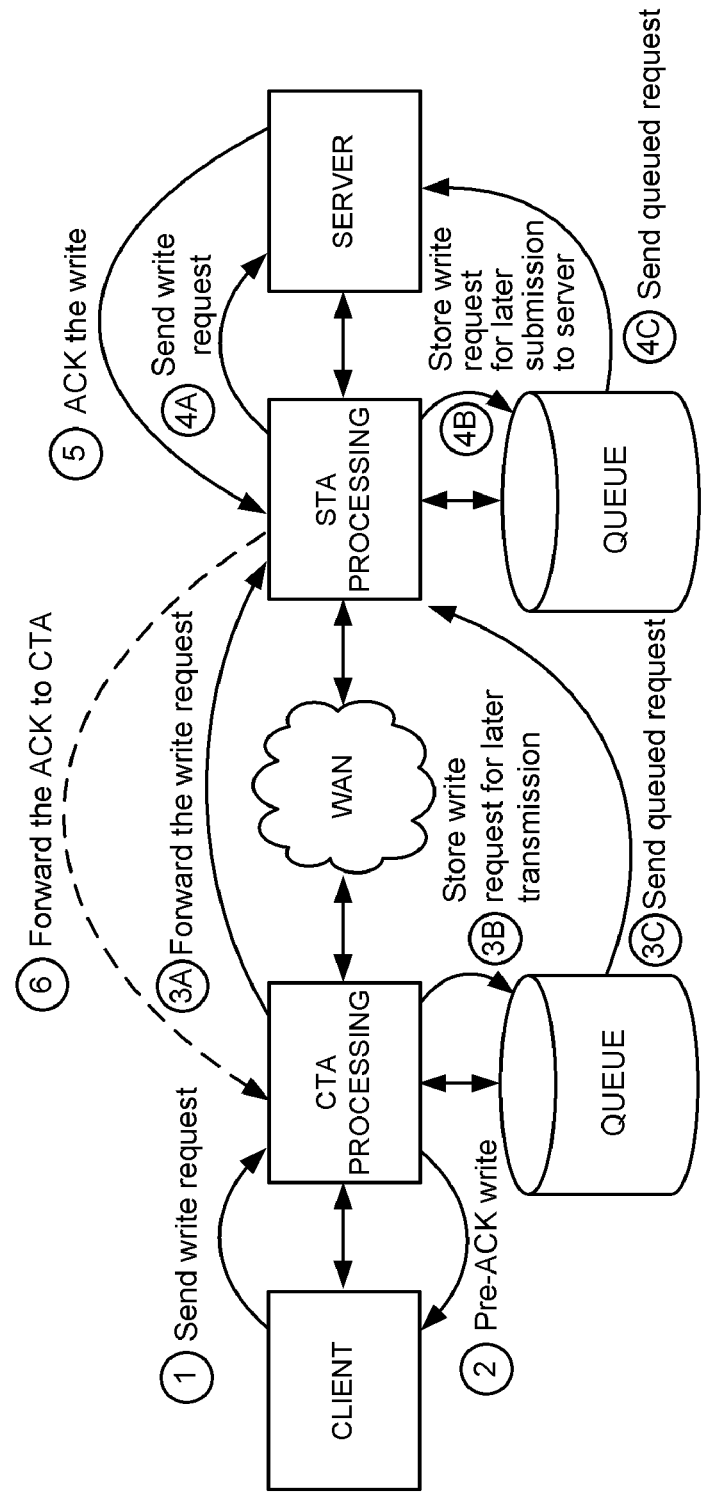
FIG. 3 illustrates a process of sending write requests and pre-acknowledging them.

FIG. 3 illustrates a process for writing data using a pair of TAs. Of course, these components could be used for other transactions. As shown there, a first step (1) is where the client sends the CTA a write request. For example, the client might send the request as part of a process of writing data to a file stored by a file server and so the request is directed at the server. However, because of the configuration having a pair of TAs in the path, the write request goes to the CTA.

The CTA then acknowledges the write request (2) to the client, which then proceeds however it is programmed to proceed after a server acknowledges a write request. The CTA also takes an action (3) of either forwarding the write request to the STA (3a), or storing the write request in the CTA's queue (3b) and then later sending it (3c).

When the STA receives the write request, possible accelerated by the action of the CTA and/or the STA, the STA takes an action (4) of either sending the write request to the server (4a), or storing the write request in the STA's queue (4b) and then later sending it (4c). If the connection between the STA and the server fails or is bad, without intervention, STA's queue could fill and overflow, resulting in lost data that might not be easily recoverable.

Once the server actually does receive the write request and does complete the write, it could be expected to issue a write ACK directed at the client (5), which is intercepted by the STA. Optionally, the STA can inform the CTA of the actual ACK (6), but the CTA need not inform the client, since the client is in a state where it already assumes that the data was written successfully.

Reducing Risk of Loss

In order to minimize the amount of data that is pre-acknowledged and vulnerable in the STA, an embodiment of the system of two transaction accelerators throttles the pre-acknowledgment of writes. Such throttling also avoids sharp changes in server processing, wastefully oscillating between too much work and too little work to do. Such throttling may be performed in terms of the server's processing, but can also be handled in terms of the server-side LAN characteristics.

In an embodiment, each relevant write is pre-acknowledged individually at the client-side transaction accelerator, and the pre-acknowledged write is then sent individually across the WAN to the STA, where it is individually handled. In such an implementation, the throttling mechanism may be simply determined by the size of the queue of writes at the STA. When the queue size of the STA reaches an upper limit, the STA sends a signal to the CTA that it should stop pre-acknowledging writes. When the queue size of the STA reaches a lower limit, the STA sends a signal to the CTA that it should again start pre-acknowledging writes. The relevant upper and lower limits can be determined by a variety of means, including explicit static configuration that might vary by network address characteristics, or dynamic settings based on time of day or traffic characteristics.

An additional complication arises in transaction accelerators using particular optimization or compression techniques, since those processes may produce traffic that is bursty. Rather than receiving a single write at a time at the STA, a single arrival of data at the STA may represent multiple writes and a substantial quantity of data. The number of writes arriving may vary with the optimization techniques in use or the particular data being transmitted, since some data compresses easily and other data is relatively uncompressible. Even identical data transmitted at different times may compress very differently, depending on the information available in the transaction accelerator's data store. The substantial variation in compression efficiency causes corresponding substantial variation in the associated burst size at the STA. Thus an embodiment to predict congestion based on the number of pending write requests at the STA may be more sophisticated than just looking at the number of such requests.

In another embodiment, one approach is to pre-acknowledge only up to a fixed amount of data at the CTA, such as 1 megabyte (MB) of data, two megabytes of data, or more or less. This approach has the merit that it provides some sort of throttling of pre-acknowledgement even in the presence of bursty interactions across the WAN. Thus, even though a burst arriving at the STA might comprise more than 2 MB of data, at most 2 MB of that data will be for write transactions that have been pre-acknowledged and thus vulnerable to loss.

However, this embodiment may not enough to solve the problem in general, since 2 MB will take about 50 seconds to communicate if the LAN connection has dropped to 1 Mbps (megabits/second). But setting a much smaller threshold (such as 1/50 of 2 MB) effectively eliminates the potential to pre-acknowledge any writes, meaning that performance drops for the vast majority of cases in which the server-side LAN connection is fully functional.

A further embodiment addresses these problems by controlling an effective queue length at the STA, wherein the effective queue length varies more smoothly than the actual queue length if that is not already smooth. This can counteract the misleading effects of burstiness so that the queue length is a good indicator of whether there is too much data being queued.

One implementation of this embodiment for smoothing the queue length is to weight pending write requests by the time that they have spent in the queue, so that a long-queued item would count for more than a recently-arrived item. Then the arrival of a burst of items would not cause as large a change in the effective queue length.

With this approach, the weights to assign for the amount of time spent in the queue may be estimated based on characteristics of the server-side LAN. Exact timers may be used. For frequent events, exact timers may have a potential impact on performance. Even if exact timers are workable on particular hardware platforms, depending on the capability of exact timers for correct performance constrains the choice of future hardware, and in particular might require the use of more expensive hardware than would otherwise be required.

Other approaches include assigning weights based on empirical observations, assigning weights based on current network conditions, or other approaches. In an embodiment, the dynamic weighting scheme is implemented with a portion at the server-side accelerator and a portion implemented at the client-side accelerator.

The STA sends one write at a time to the server. The STA also maintains a weighted queue length for the write requests, which is a smoothed version of the actual queue length.

In an embodiment, the weighted queue length, $\alpha$, in a period, i, is calculated from a current actual queue length, Q, a historic weighting parameter, K, and a weighted queue length from a prior period, i−1, according to the formula:

$$\alpha(0)=0;$$

$$\alpha_i=K\alpha_{i-1}+(1-K)Q, \text{ for } i>0$$

The parameter K is between 0 and 1 and in some implementations, K is 0.8, and in others it is more or less than 0.8. For K=0.8, the weighted effective queue length at any given iteration is determined by combining 80% of the previous iteration's effective queue length with 20% of the current actual measured queue length. Other values of K may be used to fine tune the performance of transaction accelerators for specific types of networks and applications.

In an embodiment, the STA has a virtual interval timer with a configurable interval T, which might be 50 ms or some other value. At every response received from the server, the STA recomputes the average queue length if the time elapsed since the last update is at least T. If the time elapsed since the last time is N*T, the STA runs N−1 iterations to represent the N−1 time periods for which there was no update, and then the last run is with the new value of $\alpha$.

An embodiment of the CTA maintains a pre-acknowledge window whose behavior is controlled partially by the weighted queue length on the STA. The CTA has a sliding window that starts at some fixed size W, such as 1 MB. As replies are received from the server, the window slides open a corresponding amount. The STA can both control the size of the window and control whether pre-acknowledgement is allowed.

The interaction between the STA and the CTA regarding pre-ACK limits might be determined by an upper-limit H and lower-limit L for the weighted queue length function $\alpha$. The interaction might also be controlled by a minimum queue M, a minimum flow F, and a window increment A. In a specific embodiment, H is 256 KB, L is 192 KB, M is 16 KB, F is 256 KB, and A is 128 KB.

In an embodiment using those parameters, if the weighted queue length is more than upper limit H, the STA sends a WINDOW DECREMENT AND STOP PREACK message to the CTA. When the CTA receives this message, it multiplies the pre-acknowledgment window size by a factor to reduce the window size, such as 0.6 (i.e., the CTA reduces the window to 60% of its previous size). The CTA also stops pre-acknowledging any new write requests.

Similarly, if the weighted queue length is less than lower limit L, the STA sends a RESTART PREACK message to the CTA, if the STA had previously sent a STOP PREACK message and had not restarted pre-acknowledgement since then. When the CTA receives this message, it resumes pre-acknowledging writes if the pre-acknowledge window is not already full.

If the weighted queue length is less than the minimum queue M and there has been at least minimum flow F data sent since the last update interval, then an embodiment of the STA sends a WINDOW INCREMENT message to the CTA. When the CTA receives this message, it increases the window size by window increment A and resumes pre-acknowledging if pre-acknowledgement is currently not enabled. The requirement for a minimum flow level comes about to distinguish between the case where the server-side LAN connection has improved and where the CTA only sends occasional write requests.

The description of this embodiment uses single values for K, H, L, M, F, and A. However, these parameters could be dynamically computed based on window size or other relevant characteristics.

Note that if the CTA receives a message to stop pre-acknowledging writes, an embodiment of the CTA will do so even if the pre-acknowledge window is not full. In an embodiment, the WINDOW DECREMENT message reduces the pre-acknowledge window size to max(0.6*WINDOW SIZE, A). The value 0.6 may be changed to any other arbitrary value to optimize performance for specific networks and applications. The WINDOW INCREMENT message increases the pre-acknowledge window size to min(A+WINDOW SIZE, MAXWINDOW) where MAXWINDOW may be a statically-configured maximum amount of data allowed to be pre-acknowledged, such as 2 MB, or dynamically-configured.

While the invention has been described with respect to exemplary embodiments, one skilled in the art will recognize that numerous modifications are possible. For example, the processes described herein may be implemented using hardware components, software components, and/or any combination thereof. Thus, although the invention has been described with respect to exemplary embodiments, it will be appreciated that the invention is intended to cover all modifications and equivalents within the scope of the following claims.

What is claimed is:

1. A method of limiting potential data loss when pre-acknowledging requests, the method comprising:
   receiving a message as part of a transaction at a recipient-side transaction accelerator, the message being a message for which a sender expects an acknowledgement and for which a sender-side transaction accelerator sent a recipient acknowledgement of the transaction in advance of the recipient acknowledging the transaction;
   computing a logical length for a request queue at the recipient-side transaction accelerator, the request queue for holding contents of messages not yet sent to the recipient;
   smoothing the logical length to counteract variations in an actual queue length caused by message bursts received at the recipient-side transaction accelerator; and
   adjusting the flow of pre-acknowledged requests or pre-acknowledgements at the sender-side transaction accelerator based at least on the computed logical length after being smoothed.

2. The method of claim 1, wherein the logical length for the request queue is based on the actual length of the request queue and a historical value of the logical length.

3. The method of claim 1, wherein the logical length for the request queue is the actual length of the request queue.

4. In a system where transactions are accelerated with asynchronous writes that require acknowledgements, with pre-acknowledging writes at a source of the writes, a destination-side transaction accelerator comprising:
   a queue for queue writes to a destination;
   memory for storing a status of a destination-side queue, the status comprising a logical request queue length;
   logic for smoothing the logical request queue length to counteract variations in an actual queue length caused by message bursts received at the destination-side transaction accelerator; and
   logic for signaling to a source-side transaction accelerator with instructions to alter pre-acknowledgement rules to hold off on and pursue pre-acknowledgements based at least on the logical request queue length after being smoothed.

5. The system of claim 4, wherein the logical request queue length is equal to the actual queue length.

6. The system of claim 4, wherein the destination is a file server and the source is a client having a file session with that file server.

7. The system of claim 4, wherein pre-acknowledgement rules include state of the source-side transaction accelerator when determining whether to pre-acknowledge writes.

8. The system of claim 4, wherein signaling is also a function of one or more of destination-side server processing, server-side LAN characteristics and/or the size of the write queue at the destination-side transaction accelerator.

9. In a system where transactions are accelerated with asynchronous writes that require acknowledgements, with pre-acknowledging writes at a source of the writes, a method comprising:
   queuing pre-acknowledged write requests at a destination-side transaction accelerator;
   determining a status of a destination-side queue, the status comprising a logical request queue length;
   smoothing the logical request queue length to counteract variations in an actual queue length caused by message bursts received at the destination-side transaction accelerator; and
   signaling to a source-side transaction accelerator with instructions to alter pre-acknowledgement rules to hold off on and pursue pre-acknowledgements based at least on the logical request queue length after being smoothed.

10. The method of claim 9, wherein when a size of the destination-side queue reaches an upper limit, the source-side transaction accelerator is signaled to stop pre-acknowledging writes and when the size of the destination-side queue reaches a lower limit, the source-side transaction accelerator is signaled to pre-acknowledge writes.

11. The method of claim 10, wherein the upper and lower limits are determined by one or more of explicit static configuration rules that can vary by network address characteristics and/or dynamic settings based on time of day or traffic characteristics.

12. The method of claim 9, wherein status of a destination-side queue is determined from one or more of predicted congestion based on the number of pending write requests at the destination-side transaction accelerator, the volume of the data being written, a limit on the volume of data allowed to be represented by pre-acknowledged writes, actual queue length, and/or a logical queue length other than actual queue length.

13. The method of claim 9, wherein status of a destination-side queue is determined from a logical queue length that is dependent on the actual queue length and one or more of queue pendency times for write requests, amount of time spent in the queue may be estimated based on characteristics of the server-side LAN, weights based on empirical observations, dynamic weights based on current network conditions and/or historical logical queue lengths.

\* \* \* \* \*